F. MÜLLER.
METHOD OF MAKING MILLING CUTTERS.
APPLICATION FILED DEC. 26, 1918.

1,348,296.

Patented Aug. 3, 1920.
5 SHEETS—SHEET 2.

Inventor
Frederich Müller
By S. Jay Teller
Attorney

F. MÜLLER.
METHOD OF MAKING MILLING CUTTERS.
APPLICATION FILED DEC. 26, 1918.

1,348,296.

Patented Aug. 3, 1920.
5 SHEETS—SHEET 4.

Inventor
Friedrich Müller
By S. Jay Teller
Attorney

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING MILLING-CUTTERS.

1,348,296.   Specification of Letters Patent.   Patented Aug. 3, 1920.

Application filed December 26, 1918. Serial No. 268,350.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Milling-Cutters, of which the following is a specification.

It is a well known principle in the art of cutting metals that the cutting edge of the tool should preferably be inclined with respect to the direction of relative movement so as to effect a shearing cut. This inclination is of advantage in that it improves the cutting action and it is also of advantage in that it permits the tool to engage the work gradually and with relatively little shock instead of engaging it suddenly with greater shock. This principle has been applied to relieved milling cutters which are of uniform diameter throughout and has also been applied to milling cutters having a uniform taper from one end to the other. These milling cutters have their cutting edges longitudinally inclined with respect to the axis, the cutting edge usually approximately conforming to a helix. Thus each tooth is enabled to engage the work gradually and to effect a shearing cut.

I have applied this principle to accurately made and properly relieved formed or contour cutters. By a formed or contour cutter I mean one in which the diameter varies from end to end in ways differing from a uniform taper, the cutter being thus adapted to cut a predetermined contour other than a straight line. Prior to my invention it had not been deemed practical or possible to make such cutters with inclined cutting faces. The said invention is presented and claimed in my copending application for milling cutters, Serial No. 268,349, filed on even date herewith.

The principal object of the present invention is to provide a method of making a cutter such as set forth in the said application.

As to a part of its subject matter this application constitutes a continuation of my abandoned application for milling cutters and methods of making, Serial No. 231,796 filed May 1st, 1918.

In order that my novel method may be clearly understood, I have shown in the accompanying drawings different forms of cutters embodying the invention set forth in the aforesaid application Serial No. 268,349, and I have illustrated several ways in which the method may be practised. It will be understood, however, that the drawings are for illustrative purposes only and are not to be construed as defining or limiting the scope of the invention, the accompanying claims being relied upon for that purpose. It will be particularly understood that the contour of the cutters shown has been selected merely by way of example and that any practical contour may be substituted for that shown.

Of the drawings:

Fig. 31 illustrates a milling cutter such as shown in Figs. 18 and 19 in operative relation to the tool.

In order that the method involving the invention may be clearly understood, I will first describe a cutter such as may be made in accordance therewith. Referring to the drawings, particularly to Figs. 1 to 8 thereof, it will be seen that I have shown a cutter A which is shaped to cut a predetermined contour differing from a straight line. The cutter is provided with a plurality of generally longitudinal teeth 1 between which are grooves 2, the teeth and grooves being preferably spaced uniformly. The grooves 2 between the teeth can be of any usual or preferred depth and shape, as required by the spacing and by the depth of the contour to be cut. The front wall 3 of each tooth 1 constitutes the cutting face thereof and this cutting face is radial or approximately so in order to provide a satisfactory cutting angle. Each cutting face 3 is inclined or positioned obliquely so that its longitudinal lines lie at angles to the axis of the cutter. Preferably, as shown, the entire teeth 1 are oblique or inclined, and not merely the front cutting faces 3 thereof. As concerns the broader phases of the invention, I do not narrowly limit myself in regard to the nature of the inclination of the teeth 1 or in regard to the character of the front walls or cutting faces 3, but preferably each tooth 1 is generally helical in form and each cutting face 3 conforms to a helicoid. As illustrated in Figs. 1, 2, 6 and 7, the helicoid is one formed by a generatrix following the axis of the cutter and also following a helix on a cylinder concentric with the axis thereof, the helicoid in this case being radial. The character of the helicoid may, however, be varied, especially in the manner to be set forth hereinafter. The teeth and the cutting faces may be inclined in either direction and the degree of inclination may be varied as required.

Figures 1, 2, 3, 4, 5, 6, 7, 8, 9, 10, 11, 12, 13:
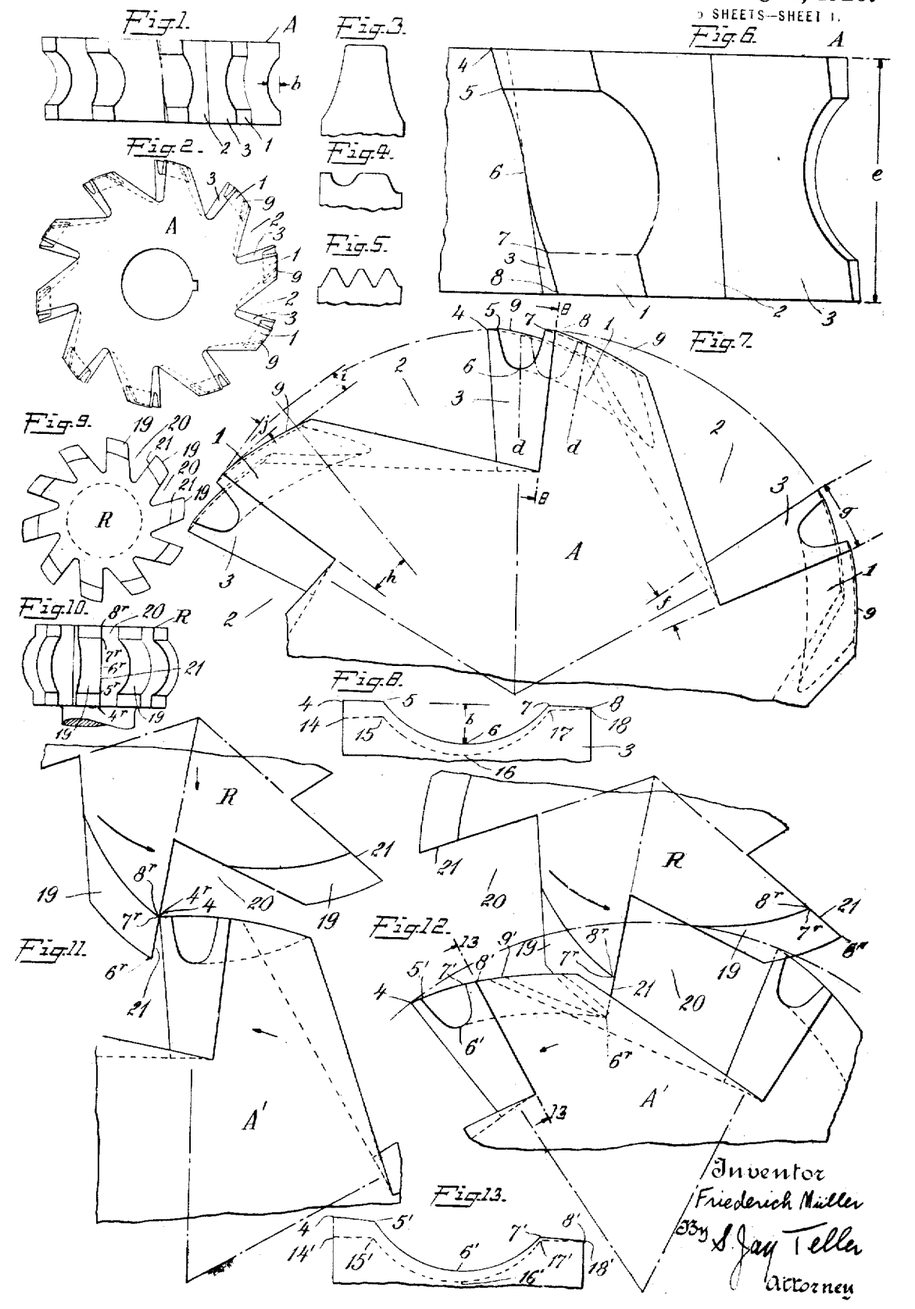
Figures 1 and 2 are plan and end views respectively of a formed milling cutter such as may be made in accordance with the invention.
Figs. 3 to 5 are views illustrating typical contours with which the cutter may be formed.
Figs. 6 and 7 are enlarged fragmentary diagrammatic plan and end views respectively of the milling cutter shown in Figs. 1 and 2. In these views there is shown a smaller number of teeth and the inclination of the cutting faces and the relief are increased in order to bring out the principles of the invention more clearly.
Fig. 8 is a diagrammatic view illustrating certain features of the cutter shown in Figs. 6 and 7.
Figs. 9 and 10 are end and bottom views respectively of a preliminary milling cutter of the general type which may be used for milling the final milling cutter shown in Figs. 1 and 2.
Fig. 11 is a diagrammatic view on the same scale as Figs. 6 and 7, illustrating the preliminary cutter in use for milling a blank for the final cutter, the milling operation having been started but not finished.
Fig. 12 is a view similar to Fig. 11 but illustrating the blank completely milled.
Fig. 13 is a diagrammatic view illustrating certain features of the incorrect final cutter which results from the milling operation shown in Figs. 11 and 12.

The cutter may be made for cutting any desired practical contour. The contour may be made up of a series of straight lines, or a series of circular arcs, or a combination of circular arcs and straight lines, or the contour may consist in whole or in part of noncircular curves. The cutter shown in Figs. 1 and 2 is adapted for cutting a contour consisting of straight end portions and a convex central portion conforming to a circular arc and having a height $b$. It will be understood that this particular contour has been selected merely for purposes of illustration and that the contour can vary in any practical way that may be desired, the invention being particularly applicable, however, to a cutter having a curved contour. Typical contours are shown in Figs. 3, 4 and 5, and it is to be understood that it may be necessary to modify the cutter, as concerns size, number of teeth, etc., in accordance with the contour selected.

The outer edge of each cutting face 3 has an outline which is shaped to cut the predetermined contour when the cutter is rotated, this outline of the cutting face following the helicoidal surface thereof. In other words the outer cutting edge of each face is of such form that the projection of the said edge about the axis of the cutter upon an axial plane of intersection is the same as the predetermined contour to be cut. This will be more clearly understood from a consideration of Figs. 6 and 7. For the particular contour illustrated, the four points 4, 5, 7 and 8 are all at equal distances from the axis of the cutter; the central point 6 is at a distance from the axis which is less by the distance $b$, and all other points along the outline are at their respective correct distances from the center so that when the cutter is rotated they will define the correct predetermined contour, as shown by full lines in Fig. 8. This relationship of the several points along the outline of the cutting face obtains notwithstanding the fact that the cutting face is a warped or helicoidal surface.

Each tooth of the cutter is relieved along lines 9 extending backward and inward from the outline of the cutting face, these relief lines forming a continuous surface or continuous surfaces, which extend from end to end of the cutter and which are properly constructed notwithstanding the variations in radius at different points along the said outline and notwithstanding the variations in angular position resulting from the warped or helicoidal cutting face. Preferably the relief lines 9 are maintained in similar relationship to each other as they extend backward and inward, the lines preferably conforming to spirals of Archimedes. The result is that each tooth of the cutter, at any axial plane of intersection, such as 8—8 has a distorted shape, as shown by dotted lines in Fig. 8. This distorted shape includes points 14, 15, 16, 17 and 18 corresponding respectively to the points 4, 5, 6, 7 and 8 on the outline of the cutting face. The distortion of shape results from the fact that the successive inward inclined relief lines 9 start at different angular positions because of the inclined or helicoidal cutting face. Therefore with the cutting face inclined in the direction illustrated the several points 17, 16, 15 and 14 to the left of the point 8 or 18 are spaced inward from the respective points 7, 6, 5 and 4 by progressively increasing distances. Notwithstanding this distortion in shape at an axial plane of intersection, the outline or effective contour at the cutting face is correct, as before stated.

When the relief lines 9 conform to spirals and are maintained in similar relationship as they extend backward and inward, as is preferred, it is possible to sharpen or grind the teeth of the cutter on the front cutting faces 3 without changing the effective contour. The teeth present the same effective contour at successive inclined surfaces of intersection similar in form and position to the initial cutting faces 3. At any surface, such as $d$—$d$, back of an initial cutting face 3 and similar to the said face, the same effective contour will be found. Therefore if the teeth are ground on their front faces to helicoids which are the same as the helicoids of the initial cutting faces the effective contour will remain the same.

Taking up now the method of making the improved milling cutter, it will be understood that the preliminary steps of turning the blank, cutting the grooves therein, etc., can be carried on in any usual or preferred way, these not of themselves constituting any part of the present invention. The invention relates particularly to the method of shaping the blank to provide a distorted shape which will enable it to cut a correct contour.

In practising the method use is made of a preliminary cutter which is used to form the shape of the final milling cutter. This preliminary cutter may be a rotating milling cutter, and a preliminary cutter of this character will first be shown and described. In Figs. 9 and 10 I have shown a preliminary milling cutter R of the general type which may be used for shaping the final cutter A, as shown in Figs. 1 and 2. This preliminary cutter R is provided with longitudinal teeth 19 which are parallel with the axis having grooves 20 between them. The teeth 19 have front cutting faces 21 conforming to planes intersecting the axis. Each cutting face 21 has a contour which is the same or approximately the same, as the effective contour of the cutter A, but which is reversely positioned, the points $4^r$, $5^r$, $6^r$, $7^r$ and $8^r$ corresponding respectively to the points 4, 5, 6, 7 and 8 of the cutter A.

In Figs. 11 and 12 I have shown the cutter R being used for shaping a blank A′ in an attempt to form the cutter A. It will be understood that the cutter R is rapidly rotating in the direction indicated by the arrow thereon; that the blank A′ is slowly rotating in the direction indicated by the arrow thereon; and that relative approaching and receding movements are effected between the cutter and the blank in timed relation to the blank rotation to provide the required relief on the final cutter. These relieving movements are preferably effected by moving the axis of the cutter bodily toward the axis of the blank, as indicated by the vertical arrow, and then bodily away from the axis of the blank in the opposite direction. Preferably the downward or inward relieving movement is so timed that the resulting relief on the blank will conform to spirals of Archimedes. The cutter R is moved slowly downward during the cutting of each tooth and then is rapidly moved upward between the teeth to position it for the cutting of the next tooth. The preliminary cutter is made with as small a diameter as possible in order to permit it to follow the relief of one tooth without interfering with or cutting into the outline of the next tooth.

As shown in Fig. 11, the cutter R and the blank have been so adjusted that the teeth of the rotating cutter will mill the initial point 4 of the tooth of the blank A' to the required distance from the axis. The downward movement of the cutter R in timed relation to the slow rotation of the blank A' causes the cutter to take a cut which gradually increases in depth at the successive points back of the point 4, the outer curve of the tooth being substantially that represented by 9' in Fig. 12. Inasmuch as the preliminary cutter R was made with an effective contour, 4$^r$, 5$^r$, 6$^r$, 7$^r$ and 8$^r$, which is the same as the predetermined contour to be cut by the cutter A, this cutter R will mill a similar contour on the blank A'. The blank therefore will have, at an axial or approximately axial plane of intersection such as 13—13, a shape 14', 15', 16', 17' and 18' which is the same as the predetermined contour, as shown by dotted lines in Fig. 13. However, because of the inclination of the cutting face combined with the relief, the successive points 5', 7' and 8' back of the point 4 lie at successively less distances from the axis of the cutter, instead of at the same distance, and all intermediate points, including the point 6', will also be at incorrect distances from the axis. The outline 4, 5', 6', 7', 8' of the cutting face as shown by full lines in Fig. 13, therefore differs from the predetermined contour, and if the cutter were to be used it would cut a distorted contour.

Figures 14, 15, 16, 17, 18, 19, 20, 21, 22:
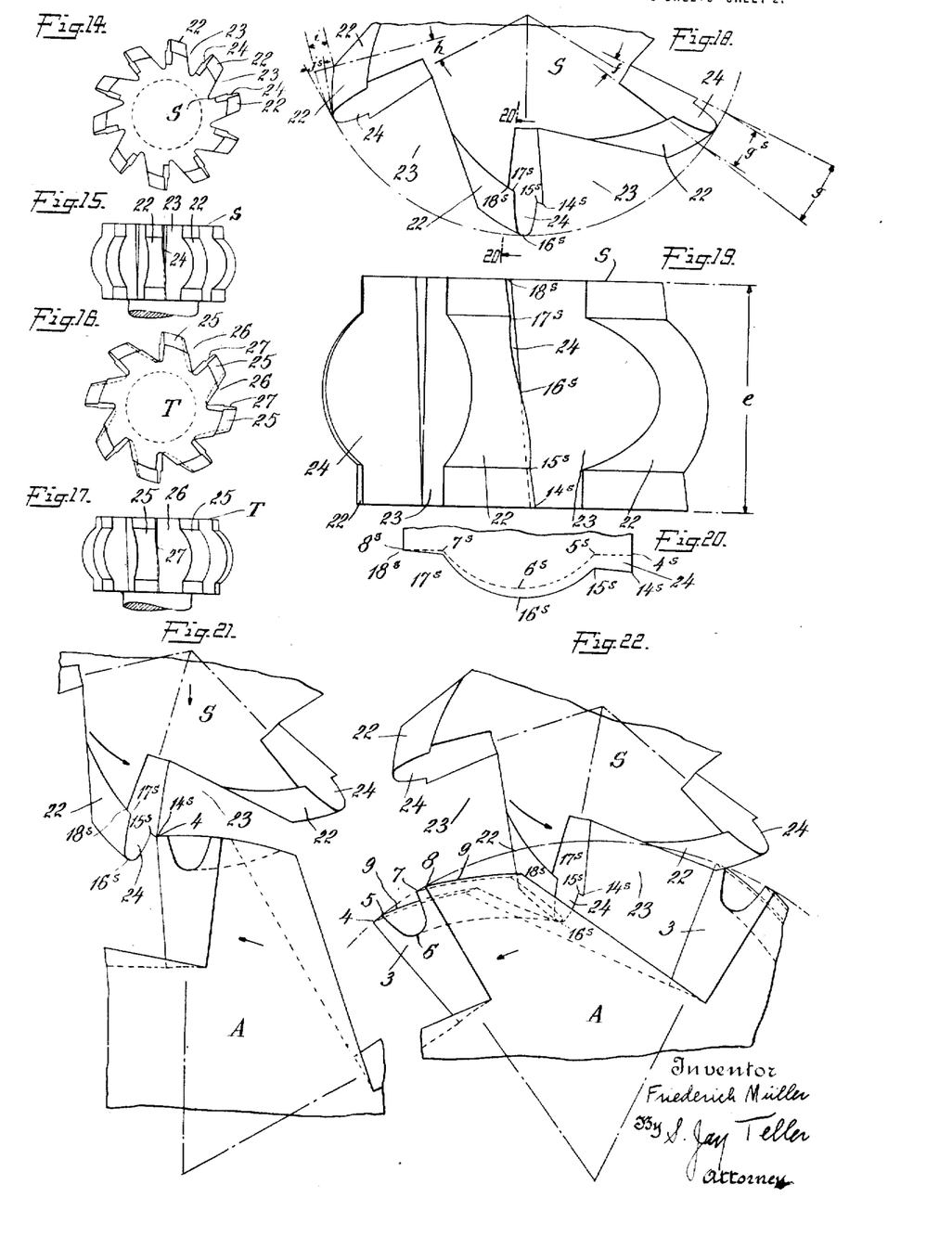
Figs. 14 and 15 are end and bottom views respectively of a preliminary milling cutter similar to that shown in Figs. 9 and 10 but modified in accordance with the present invention.
Figs. 16 and 17 are end and bottom views respectively of a preliminary milling cutter similar to that shown in Figs. 14 and 15 but differing therefrom in certain respects.
Figs. 18 and 19 are enlarged fragmentary diagrammatic end and bottom views respectively of the preliminary milling cutter shown in Figs. 14 and 15. The cutter is shown as having a smaller number of teeth and as having increased inclination and relief in conformity with the increased inclination and relief shown in Figs. 6 and 7.
Fig. 20 is a diagrammatic view illustrating certain features of the cutter shown in Figs. 18 and 19.
Fig. 21 is a view similar to Fig. 11 and illustrating the preliminary milling cutter shown in Figs. 18 and 19 in use for milling a blank for the final cutter, the milling operation having been started but not finished.
Fig. 22 is a view similar to Fig. 21 but illustrating the blank completely milled.

Figs. 14 and 15 show a preliminary milling cutter S which is somewhat similar to the cutter R shown in Figs. 9 and 10. The cutter S is provided with longitudinal teeth 22 having grooves 23 between them. The front cutting faces 24 of the teeth, instead of being parallel with the axis, are beveled by grinding or otherwise to form helicoidal surfaces in accordance with one step of my novel method. It will be noted that the cutter S has exactly the same number of teeth as the final cutter A. This is not essential but is preferable for reasons which will presently be made clear.

Figs. 16 and 17 show a cutter T which is somewhat similar to the cutter S shown in Figs. 14 and 15. The cutter T is provided with generally longitudinal teeth 25 having grooves 26 between them. The front cutting faces 27 of the teeth conform to helicoidal surfaces, being the same as the cutting faces 24 of the teeth of the cutter S. The cutter T differs from the cutter S principally in having the entire teeth 25 inclined and not merely the front cutting faces thereof. The cutter T also differs from the cutter S in that it has a smaller number of teeth.

Referring more particulaly to the diagrammatic Figs. 18 and 19, it is to be observed that the preliminary cutter S or T has at planes of intersection transverse to the lines of cutting a shape which is the same, or approximately the same as the predetermined contour to be cut by the final cutter A. For a milling cutter such as S or T these planes are longitudinal and axial, the shape at such a plane 20—20 being the same or approximately the same as the predetermined contour, as shown by dotted lines in Fig. 20. For the method as illustrated in Figs. 14 to 22, while the contour is the same, it is reversely positioned with respect to the axis, the points which are outermost on the final cutter being innermost on the preliminary cutter and vice versa. The shape at an axial plane of intersection such as 20—20 has points 4$^s$, 5$^s$, 6$^s$, 7$^s$ and 8$^s$ corresponding respectively to the points 4$^r$, 5$^r$, 6$^r$, 7$^r$ and 8$^r$ of the cutter R shown in Figs. 9 to 12, and also corresponding respectively to the points 4, 5, 6, 7 and 8 on the effective contour of the final cutter A.

Each cutting face of the preliminary cutter has a degree of inclination which bears a predetermined ratio to the degree of inclination of the cutting face of each tooth of the final cutter A. In the case of a milling cutter such as S or T having a plurality of teeth with helicoidal cutting faces the "degree of inclination" in each case is represented by the ratio between a unit of length measured parallelly with the axis and longitudinally of the contour and the angular advance of the cutting face corresponding to the said unit of length. The actual angles of inclination with respect to the axis may differ because of different diameters but the degree of inclination, as defined above, may remain the same. With a milling cutter having helicoidal cutting faces the degree of inclination is inversely proportional to the longitudinal pitch of the helicoids, and for the sake of convenience I will refer principally to the longitudinal pitch instead of to the degree of inclination.

Any convenient ratio between the degrees of inclination or between the longitudinal pitches may be selected, but it is usually most convenient to provide the preliminary cutter S or T with helicoidal surfaces which are constructed with the same degree of inclination, and therefore with the same longitudinal pitch, as that of the helicoidal surfaces of the final cutter A, the ratio in this case being one to one. In this case, as shown in Figs. 14 to 22 of the drawings, the ratio of the degrees of inclination is one to one, and the ratio of the longitudinal pitches is also one to one. The helix along which travels the generatrix of a helicoid of a tooth of the preliminary cutter S or T, has the same longitudinal pitch as has the corresponding helix for a helicoid of a tooth of the final cutter A.

For reasons already stated the preliminary cutter is preferably much smaller in diameter than the final cutter, and when this is the case, as shown in the drawings, there is an apparent difference in the helicoidal surfaces of the two cutters. While the helicoids are in reality the same, being determined by the same or similar directrices, the actual angle of inclination is less for the preliminary cutter S or T than for the final cutter A because of the smaller diameter. For the cutter A as illustrated in Figs. 6 and 7 the length $e$ of the cutter may be taken as the unit of length, and it will be seen that the corresponding angular advance is represented by $f$. For the cutter S as illustrated in Figs. 18 and 19 the same unit of length $e$ is taken, and the angular advance $f$ is kept the same. The actual linear advance of one end of the cutting face with respect to the other at the outside radius of the cutter A is represented in Fig. 7 by $g$. Taken at the same radius the advance is the same for the cutter S as shown in Fig. 18, but at a smaller radius there is a smaller advance $g^s$ and the actual angle of inclination of the cutting face is less. For reasons which will presently appear the actual angle of inclination of the cutting face of the preliminary cutter is immaterial, and therefore the diameter of the preliminary cutter S or T can be varied as desired without interfering with the practice of my method. It is important, however, for the method as illustrated in Figs. 14 to 22, that the direction of inclination be the same for the preliminary cutter as for the final cutter. If the final cutter is to have left-hand helicoids as shown the preliminary cutter must also have left-hand helicoids; or if the final cutter is to have right-hand helicoids the preliminary cutter must have right-hand helicoids.

Each tooth of the preliminary cutter has a degree of relief which bears a predetermined ratio to the degree of relief of the teeth of the final cutter. In the case of a milling cutter such as S or T the "degree of relief" in each case is represented by the ratio between the angular advance of the cutter and the corresponding decrease in radius. In the case of spiral relief, the relief lines for the same degree of relief must always conform to similar spirals constructed about the center. The aforesaid ratio between the degree of relief of the preliminary cutter and the degree of relief of the final cutter must be the inverse of the ratio between the degree of inclination of the cutting faces of the preliminary cutter and the degree of inclination of the cutting faces of the final cutter, or it must be the same as the ratio between the longitudinal pitch of the helicoids of the preliminary cutter and the longitudinal pitch of the helicoids of the final cutter. As before stated, it is usually most convenient to make the degrees of inclination the same, that is to make the two cutting faces correspond to similar helicoids as illustrated in Figs. 14 to 22. In this case the ratio of the degrees of inclination is one to one, and the inverse of this ratio is also one to one. Therefore for this special case the degrees of relief for the two cutters are the same.

As applied to the cutters S and A, the decrease in radius for each increment of angular advance of the cutter S is the same as the decrease in radius for each increment of angular advance of the cutter A. For any angle such as $h$ of either cutter the decrease in radius or the amount of clearance, is $i$. While the degree of relief is the same for both cutters, there is an apparent difference because of the smaller diameter of the cutter S. The relief lines meet the circumferential lines at a relatively small angle such as $j$ for the cutter A and at a relatively large angle such as $j^s$ for the cutter S, but it will be remembered that the degrees of relief are the same, as before explained.

As the result of the intersection of the helicoidal cutting face of each tooth of the cutter S with the spiral relief lines thereof, the outline or contour of the cutting face is distorted, as shown by full lines in Fig. 20. This distorted contour has points $14^s$, $15^s$, $16^s$, $17^s$ and $18^s$, all points $17^s$, $16^s$, $15^s$ and $14^s$ to the right of the point $8^s$ or $18^s$ being spaced outward from the respectively corresponding points $7^s$, $6^s$, $5^s$ and $4^s$ by progressively increasing distances. Inasmuch as the teeth of the preliminary cutter S are provided with helicoidal cutting faces having the same pitch as the helicoidal cutting faces of the teeth of the final cutter A and are provided with the same degree of relief as the teeth of the final cutter the extent of distortion is the same as that resulting from the milling operation shown in Figs. 11 and 12. The actual inclination of each cutting face of the cutter S is less by reason of the smaller diameter but the amount of relief is more for the same reason, and these differences exactly compensate for each other.

Figs. 21 and 22 are similar respectively to Figs. 11 and 12 and show one method which may be used for generating the shape of the preliminary cutter from the preliminary cutter. As illustrated the preliminary cutter S is used directly for milling a cutter blank A. Fig. 21 shows the cut being started, the preliminary cutter S being so adjusted that the points $14^s$ on the teeth of the rotating cutter will engage the point 4 of the first tooth of the blank A. As the cutter blank A is slowly turned and as the cutter S is fed downward in accordance with the relief, the parts move to the position shown in Fig. 22, the distorted shape of the cutter S exactly compensating for the distortion which would otherwise have taken place in the shape of the cutter A as illustrated in Fig. 12. The cutter S shapes the cutter A with the several points 4, 5, 6, 7 and 8 all at the proper distances from the axis, so that the cutter A when used will cut the true contour, as shown by full lines in Fig. 8.

While it is possible to use either the preliminary cutter S or the preliminary cutter T, the cutter S has advantages for certain classes of work as it can be easily contain classes of work as it can be easily constructed in two stages. It can be initially made with plane longitudinal or axial cutting faces like those of the cutter R shown in Figs. 9 and 10. While in this form it can be used to mill a contour on a trial blank (without relief) and this trial contour can be gaged or otherwise tested to make sure that the preliminary cutter is correct. After the cutter has been found to be correct it can then be ground to form the helicoidal cutting faces as shown in Figs. 14 and 15. It will be understood that for the cutter T the grooves are initially made at an inclination and that therefore the cutter cannot be used for a trial cut as described above.

As I have already stated, it is preferable for the preliminary cutter to have the same number of teeth as the final cutter. This is not essential and I have therefore shown the cutter S with the same number of teeth and the cutter T with a different number of teeth. However, when the preliminary cutter has the same number of teeth it is relatively easy to provide the same degree of relief on the two cutters. It is well known that a relieving machine is usually provided with a cam which rotates in timed relation to the rotation of the cutter to be relieved. When the numbers of teeth are the same, the preliminary cutter can be made with a cam, which is the same as or similar to the cam to be afterward used for relieving the final cutter, it being understood that a non-rotary tool having the correct contour is used for relieving the preliminary cutter. In this way each tool of the preliminary cutter is given the same amount of relief as a tooth of the final cutter, and as it occupies the same circumferential angle the degree of relief must be the same. When the numbers of teeth are different, different cams must be used.

I have already stated that the preliminary cutter must have the degree of inclination of the cutting faces and the degree of relief bearing inverse ratios respectively to the degree of inclination of the cutting faces of the final cutter and to the degree of relief of the final cutter; or in other words, that the pitches of the helicoids of the teeth of the preliminary and final cutters must have the same ratio as the degrees of relief of the teeth of the two cutters. I have illustrated the special case in which each ratio is one to one. To clearly bring out the fact that the ratios may be varied I have shown in Figs. 23 and 24 a preliminary milling cutter U provided with teeth 28 having grooves 29 between them. The cutter U has at an axial plane such as 20—20 a shape which is the same or approximately the same as the predetermined contour, as shown by dotted lines in Fig. 20. The teeth are formed with helicoidal cutting faces 30 having a pitch bearing a ratio of one to two to the pitch of the helicoids of the teeth of the cutter A. For the length $e$ the angular advance is $f^u$ which is twice the angular advance $f$ of the cutter A as shown in Fig. 7. The actual linear advance of one end of the cutting face with respect to the other is $g^u$ which is twice the advance $g^s$ shown in Fig. 18 and corresponds to twice the advance $g$ shown in Fig. 7. It follows that the teeth of the cutter U have a degree of relief bearing a ratio of one to two to the degree of relief of the teeth of the cutter A, the same as the ratio of the longitudinal pitches. For the angle $h$ the decrease in radius is $i^u$ which is one-half the decrease $i$ shown in Figs. 18 and 7. As the result of the increased inclination of the cutting faces and the smaller relief there is formed a distorted effective contour having points $14^u$, $15^u$, $16^u$, $17^u$ and $18^u$ which are at exactly the same distances respectively from the axis as are the points $14^s$, $15^s$, $16^s$, $17^s$ and $18^s$ of the cutter S, as shown by full lines in Fig. 20. The decrease in the pitch (with a corresponding increase in the angle of inclination) is exactly compensated for by the proportionate decrease in the degree of relief.

Figures 23, 24, 25, 26, 27, 28:
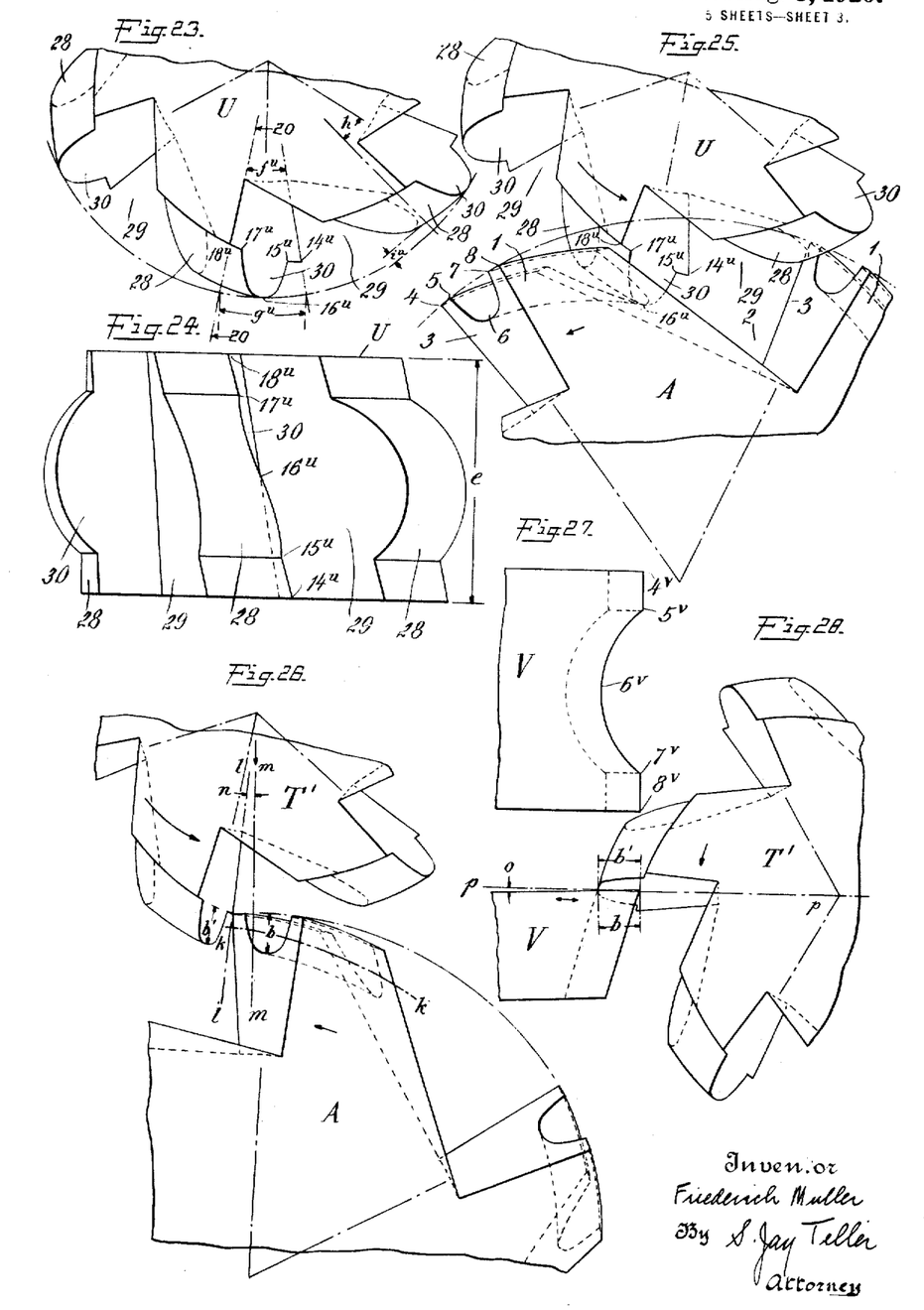
Figs. 23 and 24 are views similar respectively to Figs. 18 and 19 but showing a preliminary milling cutter of the type shown in Figs. 16 and 17 having its cutting faces arranged at a greater inclination and having a smaller degree of relief.
Fig. 25 is a view similar to Fig. 22 and illustrating the preliminary milling cutter shown in Figs. 23 and 24 in use for milling a blank for the final cutter.
Fig. 26 is a view similar to Fig. 21, but showing the preliminary cutter in operative relation to a finished final cutter, such as shown in Figs. 6 and 7. In this view, and in the views which follow, the degree of relief is not so greatly increased.
Fig. 27 is a plan view of a lathe tool adapted to be used for shaping the preliminary milling cutter.
Fig. 28 is a diagrammatic view illustrating a method of shaping the preliminary milling cutter, use being made of the tool shown in Fig. 27.

Fig. 25 shows the cutter U being used for milling the cutter A. It will be clear that the operation is exactly the same as that illustrated in Figs. 21 and 22, the cutter A being milled to the correct shape. The method involving the use of a preliminary cutter such as U having helicoidal cutting faces with a different pitch and having a different relief is set forth in my copending application for methods of making milling cutters, Serial No. 268,351, filed on even date herewith.

Referring to Fig. 26, it will be noted that the dot-and-dash line $k$—$k$ represents in a general way the direction of relative movement of the preliminary milling cutter in forming the relieved outline of the tooth on the cutter A. As the preliminary cutter T′ is rapidly rotating its plane of maximum depth of cutting will necessarily be perpendicular to the line $k$—$k$. Cutting to the maximum depth of contour will therefore be effected at a plane such as $l$—$l$ perpendicular to the line $k$—$k$. The transverse shape of the tooth of the cutter A will therefore be determined as the successive parts of the teeth pass the plane $l$—$l$. But when the cutter A is afterward used in a milling operation it will cut to its maximum depth and determine the contour of the body being cut at a plane such as $m$—$m$ passing through the axis. Clearly the planes $l$—$l$ and $m$—$m$ are not and cannot be parallel, there being an angle such as $n$ included between them. The depth distance $b$ of the final cutter measured along the plane $m$—$m$ is slightly greater than the depth distance $b'$ of the preliminary cutter measured along the plane $l$—$l$. Therefore, if the preliminary cutter has exactly the predetermined shape at axial longitudinal planes of intersection, a slight error in the shape of the final cutter results from the fact that the shape is formed at the plane $l$—$l$ and used at the plane $m$—$m$. This error is very slight and for many classes of work can be treated as entirely negligible. However, for work requiring the very highest degree of accuracy it may be desirable to correct this error. I do not limit myself to any one way of making the correction, but the error can conveniently be corrected by shaping the preliminary cutter in the way to be described.

Fig. 27 shows a lathe tool V having a contour $4^v$, $5^v$, $6^v$, $7^v$, $8^v$, which is exactly the same as the predetermined contour 4, 5, 6, 7, 8, which is to be finally cut by the cutter A. This tool is used in a relieving lathe to shape the preliminary cutter T′ as illustrated in Fig. 28. The cutter T′ is closely similar to the cutter T and detailed description is not necessary. The tool V is set with its cutting face in a non-axial plane, an angle such as $o$ being included between the cutting face of the tool and a plane such as $p$—$p$ through the axis of the cutter. When the preliminary cutter is being formed it is rotated in the direction of the arrow, the tool V being moved in and out as indicated by the horizontal arrow so as to follow the proper relief lines.

As before stated the depth $b$ of the contour measured along the plane $m$—$m$ will be slightly greater than the depth $b'$ measured along the plane $l$—$l$. In order to make the depth $b$ correct at the plane $m$—$m$, the depth $b'$ at the plane $l$—$l$ must be slightly decreased. In Fig. 28 the plane $p$—$p$ corresponds in a general way to the plane $l$—$l$, and by setting the tool at an angle, as indicated, the depth $b'$ of the contour at the plane $p$—$p$ is made slightly less than the full depth $b$ measured along the top plane of the tool V. From the foregoing description it will be seen that, by the method illustrated, the depth of the contour of the final cutter A at the plane $m$—$m$ is properly corrected.

In describing the cutter A shown in Figs. 1 and 2 and Figs. 6 and 7, I stated that each cutting face preferably conforms to a helicoid formed by a generatrix following the axis of the cutter and also following a helix on the outline of the cutter. If desired, there can be variation from this form of helicoid and the helicoid can be one formed by a generatrix following the aforesaid helix on a cylinder concentric with the axis and also following a helix of the same longitudinal pitch on a smaller concentric cylinder. A cutter C with such cutting faces is fragmentarily illustrated in Fig. 29. The cutter has teeth 31 with grooves 32 between them. It will be seen that the front faces 33 of the teeth 31 are "undercut;" that is they are so formed that planes perpendicular to the axis of the cutter will intersect, not along radial lines but, along lines such as $q$—$q$ each at an angle such as $q'$ to the corresponding radius. If it be assumed that the external helix of generation is the same for the cutter C as for the cutter A the outermost points $4^c$, $5^c$, $7^c$, and $8^c$ are not changed from the positions occupied by the corresponding points 4, 5, 7 and 8 of the cutter A, as shown in Fig. 7. All other points, however, such as the point $6^c$ spaced inward from the periphery will be located further back along the relief lines and would therefore be nearer the axis of the cutter if the cutter were to be milled by a cutter S or T, in the way shown in Figs. 21 and 22.

Figure 29:
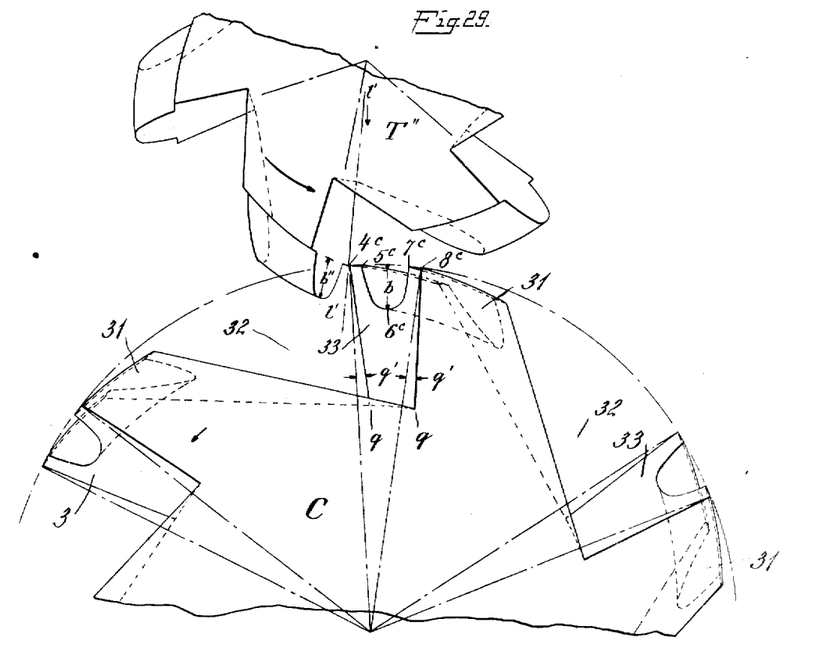
Fig. 29 is a fragmentary diagrammatic view showing a final cutter having nonradial or undercut cutting faces. A preliminary milling cutter is shown in operative relation to the final cutter.
Figure 30:
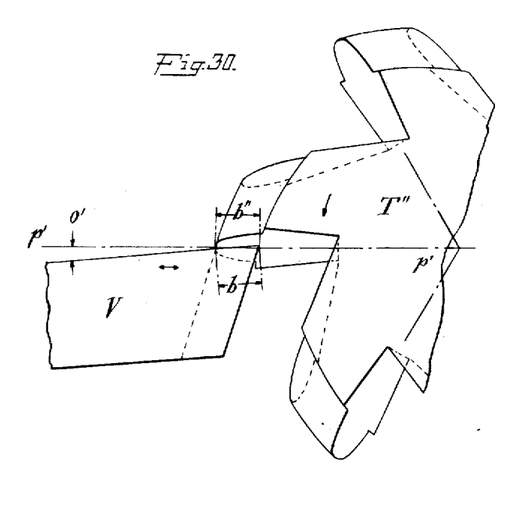
Fig. 30 is a view similar to Fig. 28 and illustrating a method of shaping the preliminary milling cutter shown in Fig. 29.

The shape milled by the cutter S or T would be erroneous, and, in order that the shape may be correctly milled, use may be made of a preliminary cutter such as T″ formed by the method illustrated in Fig. 30. Use is made of a lathe tool V which may be the same as that already shown in Figs. 27 and 28. This tool is set with its cutting face in a non-axial plane, an angle such as $o'$ being included between the cutting face of the tool and a plane such as $p'—p'$ through the axis of the cutter. The angle $o'$ is somewhat greater than the angle $o$ shown in Fig. 28. Inasmuch as the contour has the correct depth $b$ measured along the top face of the tool it will have a slightly shorter depth $b''$ measured along the plane $p'—p'$. When the cutter T'' is used to mill the cutter C as shown in Fig. 29 it will cut a contour which is of insufficient depth measured along the plane $l'—l'$ but which has the correct depth $b$ when measured radially from the respective points along the cutting edge. A cutter such as C with undercut teeth is made the subject of my copending application for milling cutters, Serial No. 323,110, filed Sept. 11, 1919, and the herein disclosed method of making such a cutter is presented in my copending application for methods of making milling cutters, Serial No. 323,111, filed Sept. 11, 1919.

Difficulty is frequently encountered in attempting to mill a cutter in the way illustrated in Figs. 21 and 22 and in other figures. As already stated, the preliminary milling cutter is made as small as possible in order to avoid interference with the front of one tooth while finishing the back of the preceding tooth. Frequently, however, it is impossible to avoid such interference, particularly when there is considerable depth of contour, or when the cutting faces are sharply inclined, or when the degree of relief is large. In such cases it is necessary to make use of a lathe tool which can be quickly withdrawn and which of course has no parts located beyond the cutting plane, as is the case with a rotating milling cutter. The lathe tool has the additional advantage that no correction is required, as shown in Figs. 26 to 28.

A cutter made by means of a lathe tool in the manner to be described may have parts of its contour sharply inclined with respect to the axis as shown in Figs. 3, 4 and 5, and the outer relieved surface of each tooth may extend backward toward the next following tooth to an extent beyond that to which it could be cut by a preliminary shaped milling cutter such as hereinbefore described. A cutter of this type is set forth in my copending application for milling cutters, Serial No. 368,928, filed March 26th, 1920.

When a lathe tool is to be used the method is similar to that which is already described except that certain supplemental steps are interposed. A preliminary cutter is constructed as before described and is used to form the proper distorted shape on a lathe tool and then this lathe tool having the distorted shape is used to cut the final cutter.

Figures 31, 32:
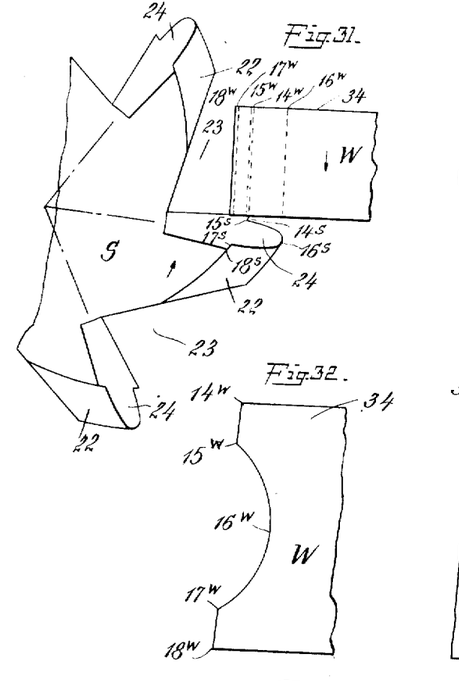
Figs. 31 and 32 are side and plan views respectively of an intermediate tool which may be used for making a lathe tool adapted to be used for cutting a final cutter such as shown in Figs. 6 and 7.

In following this alternate method, a preliminary milling cutter is used and, as shown in Fig. 31, this cutter may be the same as or similar to the cutter S already described. For this form of method no correction of the preliminary cutter is required. The cutter S is used to mill an intermediate tool W providing the said tool at its cutting face 34 with a distorted contour which is the same as the effective contour of the cutter S shown by full lines in Fig. 20. This distorted contour is illustrated in the plan view in Fig. 32, the contour having points $14^w$, $15^w$, $16^w$, $17^w$ and $18^w$ corresponding respectively to the points $14^s$, $15^s$, $16^s$, $17^s$ and $18^s$ of the effective contour of the cutter S. It will be observed that the tool W is formed without relief, it being fed perpendicularly to its cutting face 34, as indicated by the arrow in Fig. 31.

Figure 33:
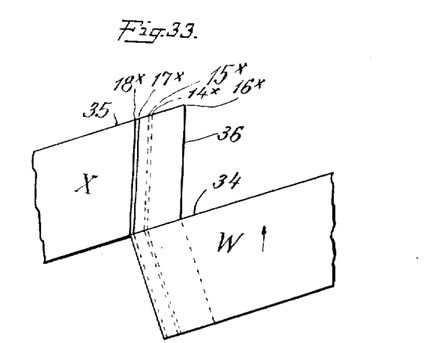
Fig. 33 illustrates the intermediate tool shown in Figs. 31 and 32 in use for making the lathe tool.
Figure 34:
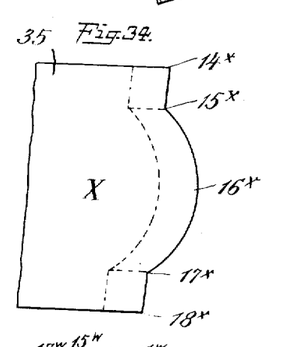
Fig. 34 is a plan view of the lathe tool.

The intermediate tool W is used, as shown in Fig. 33, for cutting a lathe tool X. The tool X has a cutting face 35 and has its front face 36 inclined with respect to the cutting face to provide the necessary relief. The tool W is set with its cutting face 34 parallel with the cutting face 35 of the tool X, and relative reciprocation is then effected along lines parallel with the front face 36. The result is that the cutting face 35 is formed with a distorted contour which is exactly the same as the distorted contour of the face 34 of the tool W. This distorted contour is shown in Fig. 34 and it has points $14^x$, $15^x$, $16^x$, $17^x$ and $18^x$ corresponding respectively to points $14^w$, $15^w$, $16^w$, $17^w$ and $18^w$ of the tool W.

Figure 35:
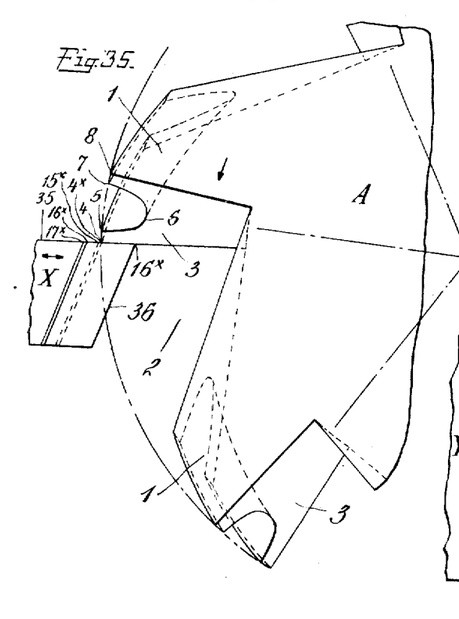
Fig. 35 is a diagrammatic view illustrating the lathe tool shown in Figs. 30 and 32 in use for cutting a final cutter.

Fig. 35 shows the tool X being used for shaping the cutter A. It will be understood that the blank is rotated as indicated by the arrow and that the tool X is moved inward and outward in timed relation to the rotation to provide the relief. The distortion of the contour of the tool X is just sufficient to offset the distortion which would otherwise take place in the contour of the cutter A, and the result is that the cutter A is formed with the correct effective contour.

It may be desirable to rough out the final cutter by means of a milling cutter such as cutter by means of a milling cutter such as S and then finish it by means of a lathe tool such as X. In this way the greater part of the metal can be removed by the milling cutter and then the cutter can be accurately shaped by the lathe tool.

The method involving the use of a lathe tool is presented in my copending application for methods of making milling cutters, Serial No. 268,352, filed on even date herewith.

Figures 36, 37, 38:
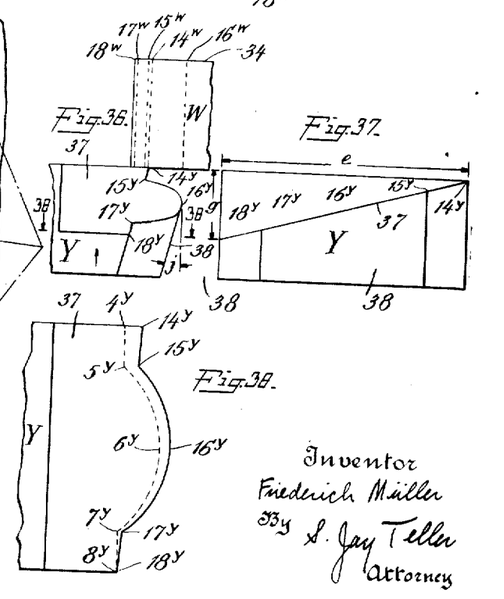
Fig. 36 is a view similar to Fig. 31, but illustrating a preliminary reciprocable tool instead of a preliminary milling cutter.
Fig. 37 is an end view of the preliminary tool shown in Fig. 36.
Fig. 38 is a diagrammatic plan view illustrating certain features of the tool shown in Figs. 36 and 37.

The intermediate tool W can also be made by the use of a preliminary reciprocable cutter in lieu of the preliminary milling cutter, shown in Fig. 31. Figs. 36 to 38 show a preliminary reciprocable cutter or tool Y such as may be used. This tool is adapted to be reciprocated along straight lines, as indicated by the vertical arrow in Fig. 36. At a plane such as 38—38 transverse to the lines of reciprocation, the tool has a shape which is the same as the predetermined contour to be cut by the final cutter A. This is shown by dotted lines in Fig. 38 in which the points $4^y$, $5^y$, $6^y$, $7^y$ and $8^y$ correspond respectively to the points $4^s$, $5^s$, $6^s$, $7^s$ and $8^s$ of the cutter S, as shown in Fig. 20. The top face 37 of the tool is inclined, as shown in Fig. 37. The front face 38 of the tool is also beveled or inclined, as shown in Fig. 36 to provide the required relief.

The top face 37 of the tool has a degree of inclination which bears a predetermined ratio to the degree of inclination of the cutting face of each tooth of the final cutter A. In the case of a reciprocable tool, such as Y, the degree of inclination is represented by the ratio between a unit of length measured longitudinally of the contour and transversely of the lines of movement and the amount of rise corresponding to the said unit of length and measured parallelly with the lines of movement. Any convenient degree of inclination may be selected but I have shown a degree of inclination the same as that of the cutters A and S. Taking the width $e$ of the tool as the unit of length it will be seen that the corresponding amount of rise is $g$, which is the same as the advance or rise for the cutter A at the outside radius thereof.

The front face 38 has a degree of relief which bears a predetermined ratio to the degree of relief of the final cutter. In the case of a reciprocable tool such as Y, the degree of relief is represented by the ratio between a unit of length measured parallelly with the lines of movement and the corresponding amount of clearance. If the degree of inclination is the same as for the final cutter, as shown, the degree of relief is also the same. Inasmuch as the rise $g$ for the tool Y is the same as the advance or rise for the cutter A at the outside radius, the front face is given an amount of clearance which is the same as that of the cutter A at the outside radius thereof. In other words the tool is given a relief angle $j$ which is the same as the relief angle of the cutter A at the outside radius thereof. As the result of the intersection of the inclined cutting face 37 with the inclined front face 38, the outline or contour of the cutting face 37 is distorted as shown by full lines in Fig. 38. This distorted contour has points $14^y$, $15^y$, $16^y$, $17^y$ and $18^y$ which correspond exactly to the points $14^s$, $15^s$, $16^s$, $17^s$ and $18^s$ of the cutter S as shown by full lines in Fig. 20.

The tool Y is used to make the tool W as shown in Fig. 36, the tool W being given exactly the same contour as in the method illustrated in Fig. 31. The tool W can then be used as before described, the subsequent steps being as shown in Figs. 33 to 35.

The method involving the use of a reciprocable preliminary cutter is presented in my copending application for methods of making milling cutters, Serial No. 268,353, filed on even date herewith.

What I claim is:

1. The herein described method of shaping a relieved milling cutter adapted to cut a predetermined contour other than a straight line and having cutting faces inclined with respect to the axis, the method consisting in forming a preliminary cutter having at planes of intersection transverse to the lines of cutting a shape the same or approximately the same as the predetermined contour and provided with a cutting face with a degree of inclination bearing a predetermined ratio to the degree of inclination of the cutting faces of the final cutter and provided with a degree of relief bearing a ratio to the degree of relief of the teeth of the final cutter which is the inverse of the ratio between the degrees of inclination, and in forming the shape of the relieved final milling cutter from the said preliminary cutter whereby the final cutter is formed with a distorted shape at axial planes of intersection but is adapted to cut the correct contour when rotated.

2. The herein described method of shaping a relieved milling cutter adapted to cut a predetermined contour other than a straight line and having cutting faces inclined with respect to the axis, the method consisting in forming a preliminary milling cutter having at longitudinal planes of intersection transverse to the lines of cutting a shape the same or approximately the same as the predetermined contour and having its teeth provided with cutting faces with a degree of inclination bearing a predetermined ratio to the degree of inclination of the cutting faces of the final cutter and provided with a degree of relief bearing a ratio to the degree of relief of the teeth of the final cutter which is the inverse of the ratio between the degrees of inclination, and in forming the shape of the relieved final milling cutter from the said preliminary milling cutter whereby the final cutter is formed with a distorted shape at axial planes of intersection but is adapted to cut the correct contour when rotated.

3. The herein described method of shaping a relieved milling cutter adapted to cut a predetermined contour other than a straight line and having cutting faces inclined with respect to the axis, the method consisting in forming a preliminary milling cutter having at longitudinal planes of intersection transverse to the lines of cutting a shape the same or approximately the same as the predetermined contour and having its teeth provided with cutting faces with the same degree of inclination as the cutting faces of the final cutter and provided with the same degree of relief as the teeth of the final cutter, and in forming the shape of the relieved final milling cutter from the said preliminary milling cutter whereby the final cutter is formed with a distorted shape at axial planes of intersection but is adapted to cut the correct contour when rotated.

4. The herein described method of shaping a relieved milling cutter adapted to cut a predetermined contour other than a straight line and having cutting faces inclined with respect to the axis, the method consisting in forming a preliminary milling cutter having at longitudinal planes of intersection transverse to the lines of cutting a shape the same or approximately the same as the predetermined contour and having its teeth provided with cutting faces with a degree of inclination bearing a predetermined ratio to the degree of inclination of the cutting faces of the final cutter and provided with a degree of relief bearing a ratio to the degree of relief of the teeth of the final cutter which is the inverse of the ratio between the degrees of inclination, and in milling the final milling cutter with the said preliminary milling cutter while securing the desired relief by effecting relative approaching and receding movements in correct relation to the inclined cutting faces of the final cutter whereby the final cutter is formed with a distorted shape at axial planes of intersection but is adapted to cut the correct contour when rotated.

5. The herein described method of shaping a spirally relieved milling cutter adapted to cut a predetermined contour other than a straight line and having helicoidal cutting faces, the method consisting in forming a preliminary milling cutter having at axial planes of intersection a shape the same or approximately the same as the predetermined contour and having its teeth provided with helicoidal cutting faces with a longitudinal pitch bearing a predetermined ratio to the longitudinal pitch of the helicoidal cutting faces of the final cutter and provided with a degree of spiral relief bearing the same predetermined ratio to the degree of spiral relief of the teeth of the final cutter, and in forming the shape of the relieved final milling cutter from the said preliminary milling cutter whereby the final cutter is formed with a distorted shape at axial planes of intersection but is adapted to cut the correct contour when rotated.

6. The herein described method of shaping a spirally relieved milling cutter adapted to cut a predetermined contour other than a straight line and having radial helicoidal cutting faces, the method consisting in forming a preliminary milling cutter having at axial planes of intersection a shape the same or approximately the same as the predetermined contour and having its teeth provided with radial helicoidal cutting faces with a longitudinal pitch bearing a predetermined ratio to the longitudinal pitch of the radial helicoidal cutting faces of the final cutter and provided with a degree of spiral relief bearing the same ratio to the degree of spiral relief of the teeth of the final cutter and in forming the shape of the relieved final milling cutter from the said preliminary milling cutter whereby the final cutter is formed with a distorted shape at axial planes of intersection but is adapted to cut the correct contour when rotated.

7. The herein described method of shaping a spirally relieved milling cutter adapted to cut a predetermined contour other than a straight line and having helicoidal cutting faces, the method consisting in forming a preliminary milling cutter having at axial planes of intersection a shape the same or approximately the same as the predetermined contour and having its teeth provided with helicoidal cutting faces with a longitudinal pitch the same as the longitudinal pitch of the helicoidal cutting faces of the final cutter and provided with a degree of spiral relief the same as the degree of spiral relief of the teeth of the final cutter, and in forming the shape of the relieved final cutter from the said preliminary milling cutter whereby the final milling cutter is formed with a distorted shape at axial planes of intersection but is adapted to cut the correct contour when rotated.

8. The herein described method of shaping a spirally relieved milling cutter adapted to cut a predetermined contour other than a straight line and having helicoidal cutting faces, the method consisting in forming a preliminary milling cutter having at axial planes of intersection a shape the same or approximately the same as the predetermined contour and having its teeth provided with helicoidal cutting faces with a longitudinal pitch bearing a predetermined ratio to the longitudinal pitch of the helicoidal cutting faces of the final cutter and provided with a degree of spiral relief bearing the same predetermined ratio to the degree of spiral relief of the teeth of the final cutter, and in milling the final cutter with the said preliminary cutter while securing the desired relief by effecting relative approaching and receding movements in correct relation to the helicoidal cutting faces whereby the final cutter is formed with a distorted shape at axial planes of intersection but is adapted to cut the correct contour when rotated.

9. The herein described method of shaping a spirally relieved milling cutter adapted to cut a predetermined contour other than a straight line and having helicoidal cutting faces, the method consisting in forming a preliminary milling cutter having at axial longitudinal planes of intersection a shape the same or approximately the same as the predetermined contour and having the same number of teeth as the final cutter, the teeth being provided with helicoidal cutting faces with a longitudinal pitch bearing a predetermined ratio to the longitudinal pitch of the helicoidal cutting faces of the final cutter and provided with an amount of spiral relief bearing the same predetermined ratio to the amount of spiral relief of the teeth of the final cutter, and in forming the shape of the relieved final milling cutter from the said preliminary milling cutter whereby the final cutter is formed with a distorted shape at axial planes of intersection but is adapted to cut the correct contour when rotated.

10. The herein described method of shaping a spirally relieved milling cutter for cutting a predetermined contour other than a straight line and having helicoidal cutting faces, the method consisting in forming a preliminary milling cutter having at axial planes of intersection a shape the same or approximately the same as the predetermined contour and having its teeth provided with a degree of spiral relief bearing a predetermined ratio to the degree of spiral relief of the teeth of the final cutter and initially provided with plane axial cutting faces, in subsequently beveling the teeth of the preliminary cutter and thus providing them with helicoidal cutting faces with a longitudinal pitch bearing the same predetermined ratio to the longitudinal pitch of the helicoidal cutting faces of the final cutter, and in forming the shape of the relieved final milling cutter from the said preliminary milling cutter whereby the final cutter is formed with a distorted shape at axial planes of intersection but is adapted to cut the correct contour when rotated.

11. The herein described method of shaping a spirally relieved milling cutter adapted to cut a predetermined contour other than a straight line and having helicoidal cutting faces, the method consisting in forming a preliminary milling cutter having at axial planes of intersection a shape approximately the same as the predetermined contour but with its radial dimensions slightly decreased to an extent dependent on the angle of relief of the final cutter and having its teeth provided with helicoidal cutting faces with a longitudinal pitch bearing a predetermined ratio to the longitudinal pitch of the helicoidal cutting faces of the final cutter and provided with a degree of spiral relief bearing the same predetermined ratio to the degree of spiral relief of the teeth of the final cutter, and in forming the shape of the relieved final milling cutter from the said preliminary milling cutter whereby the final cutter is formed with a distorted shape at axial planes of intersection but is adapted to cut the correct contour when rotated.

12. The herein described method of shaping a spirally relieved milling cutter adapted to cut a predetermined contour other than a straight line and having helicoidal cutting faces, the method consisting in forming a preliminary milling cutter having the correct predetermined contour at longitudinal planes of intersection slightly inclined with respect to corresponding axial planes and having its teeth provided with helicoidal cutting faces with a longitudinal pitch bearing a predetermined ratio to the longitudinal pitch of the helicoidal cutting faces of the final cutter and provided with a degree of spiral relief bearing the same predetermined ratio to the degree of spiral relief of the teeth of the final cutter, and in forming the shape of the relieved final milling cutter from the said preliminary milling cutter whereby the final cutter is formed with a distorted shape at axial planes of intersection but is adapted to cut the correct contour when rotated.

13. The herein described method of shaping a spirally relieved milling cutter adapted to cut a predetermined contour other than a straight line and having helicoidal cutting faces, the method consisting in providing an initial lathe tool having exactly the predetermined contour, in providing a preliminary milling cutter having its teeth provided with helicoidal cutting faces with a longitudinal pitch bearing a predetermined ratio to the longitudinal pitch of the helicoidal cutting faces of the final cutter and provided with a degree of spiral relief bearing the same predetermined ratio to the degree of spiral relief of the teeth of the final cutter, in utilizing the initial lathe tool to cut the shape of the preliminary cutter, the tool being set with its cutting face at an angle to the radius of the preliminary cutter whereby the said cutter is formed with the correct predetermined contour at longitudinal planes of intersection slightly inclined with respect to the corresponding axial planes, and in forming the shape of the relieved final milling cutter from the said preliminary milling cutter whereby the final cutter is formed with a distorted shape at axial planes of intersection but is adapted to cut the correct contour when rotated.

14. The herein described method of shaping a spirally relieved milling cutter adapted to cut a predetermined contour other than a straight line and having helicoidal cutting faces, the method consisting in forming a preliminary milling cutter having at axial planes of intersection a shape the same as the predetermined contour and having its teeth provided with helicoidal cutting faces with a longitudinal pitch bearing a predetermined ratio to the longitudinal pitch of the helicoidal cutting face of the final cutter and provided with a degree of spiral relief bearing the same predetermined ratio to the degree of spiral relief of the teeth of the final cutter, in milling the final cutter with the said preliminary cutter while securing the desired relief by effecting relative approaching and receding movements in correct relation to the helicoidal cutting faces, in forming a lathe tool by means of the said preliminary cutter, and in cutting the milled final cutter with the lathe tool whereby the final cutter is formed with a distorted shape at axial planes of intersection but is adapted to cut the correct contour when rotated.

In testimony whereof, I hereto affix my signature.

FRIEDERICH MÜLLER.

It is hereby certified that in Letters Patent No. 1,348,296, granted August 3, 1920, upon the application of Friederich Müller, of Hartford, Connecticut, for an improvement in "Methods of Making Milling-Cutters," errors appear in the printed specification requiring correction as follows: Page 5, line 5, for the word "insteaed" read *instead;* page 6, line 76, for the word "tool," read *tooth;* and that the said Letters Patent should be read with these corrections therein that the same may conform to the record of the case in the Patent Office.

Signed and sealed this 28th day of September, A. D., 1920.

[SEAL.]

M. H. COULSTON,

*Acting Commissioner of Patents.*

Cl. 76—101.